(12) United States Patent
Swerdlow

(10) Patent No.: US 12,375,609 B2
(45) Date of Patent: *Jul. 29, 2025

(54) USER-SPECIFIC SECURITY CREDENTIAL BYPASS FOR SHARED DEVICE VOICEMAIL

(71) Applicant: Zoom Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,121

(22) Filed: May 16, 2024

(65) Prior Publication Data

US 2024/0305718 A1 Sep. 12, 2024

Related U.S. Application Data

(63) Continuation of application No. 17/443,951, filed on Jul. 28, 2021, now Pat. No. 12,015,740.

(51) Int. Cl.
*H04M 3/533* (2006.01)
*H04M 3/38* (2006.01)
*H04M 3/53* (2006.01)
*H04M 3/537* (2006.01)

(52) U.S. Cl.
CPC ....... *H04M 3/53333* (2013.01); *H04M 3/382* (2013.01); *H04M 3/5307* (2013.01); *H04M 3/537* (2013.01); *H04M 2203/256* (2013.01)

(58) Field of Classification Search
CPC ............. H04M 3/53333; H04M 3/382; H04M 3/5307; H04M 3/537; H04M 2203/256; H04M 3/42238; H04M 2203/6045
See application file for complete search history.

(56) References Cited

U.S. PATENT DOCUMENTS

| | | | |
|---|---|---|---|
| 7,796,977 B2 * | 9/2010 | Vander Veen | ........ H04M 3/533 455/412.2 |
| 8,380,174 B2 | 2/2013 | Vander Veen | |
| 8,543,665 B2 | 9/2013 | Ansari et al. | |
| 8,731,527 B1 | 5/2014 | Naik et al. | |
| 8,817,063 B1 | 8/2014 | Lefar et al. | |
| 9,204,302 B1 * | 12/2015 | Shaw | .................... H04M 3/533 |
| 10,750,025 B2 * | 8/2020 | Demmitt | ........... H04M 3/53333 |
| 10,951,756 B1 | 3/2021 | Silverstein | |

(Continued)

OTHER PUBLICATIONS

Huang, Wenbin, et al. "Manipulating voice assistants eavesdropping via inherent vulnerability unveiling in mobile systems." IEEE Transactions on Mobile Computing (2024). (Year: 2024).*

(Continued)

*Primary Examiner* — Sharad Rampuria
(74) *Attorney, Agent, or Firm* — Young Basile Hanlon & MacFarlane, P.C.

(57) ABSTRACT

A shared device voicemail box can be accessed from a device that is an unauthenticated device without a user-specific security credential. The device transmits a request to a server. The request includes a unique code based on an image. The device accesses the voicemail box based on an access grant received from the server. Using the image, a non-registered user of a telephony system can access a secured voicemail box.

20 Claims, 8 Drawing Sheets

(56) References Cited

U.S. PATENT DOCUMENTS

| | | |
|---|---|---|
| 2012/0238249 A1 | 9/2012 | Raphael et al. |
| 2014/0282961 A1 | 9/2014 | Dorfman et al. |
| 2016/0012465 A1 | 1/2016 | Sharp |
| 2018/0054720 A1 | 2/2018 | Messenger et al. |
| 2021/0385224 A1 | 12/2021 | Singh et al. |

OTHER PUBLICATIONS

Consolvo, Sunny, and Miriam Walker. "Using the experience sampling method to evaluate ubicomp applications." IEEE pervasive computing 2.2,2003. (8 pages).

Fischell, David R., Sarbmeet S. Kanwal, and Daniel Furman. "Interactive voice technology applications." AT&T Technical Journal 69.5 (1990): 61-76. (Year: 1990).

* cited by examiner

USER-SPECIFIC SECURITY CREDENTIAL BYPASS FOR SHARED DEVICE VOICEMAIL

CROSS-REFERENCE TO RELATED APPLICATION(S)

This application is a continuation of U.S. patent application Ser. No. 17/443,951, filed Jul. 28, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
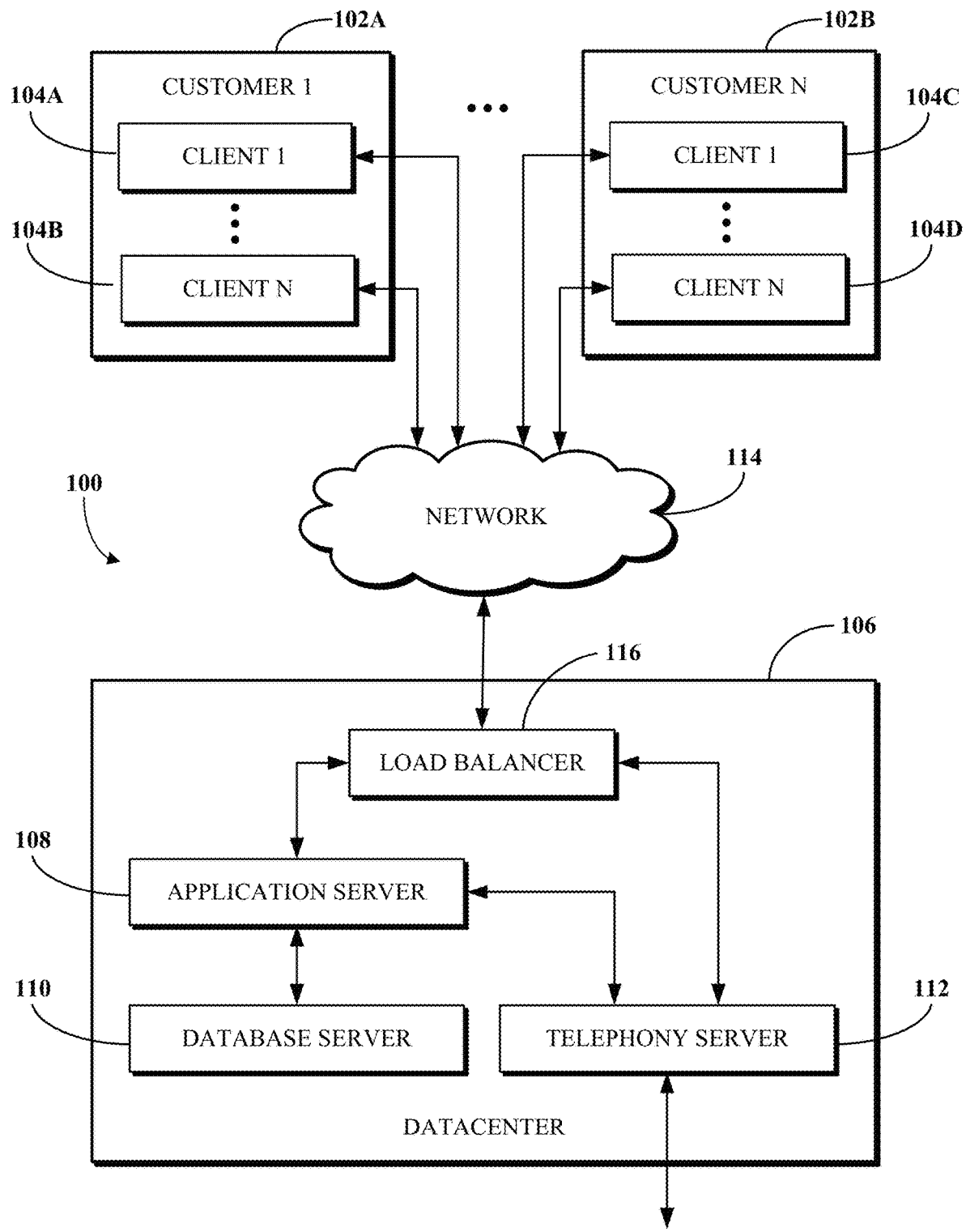
FIG. 1 is a block diagram of an example of an electronic computing and communications system.

Disclosed herein are, inter alia, implementations of systems and techniques for shared device voicemail access bypassing a user-specific security credential.

One aspect of this disclosure is a method that includes obtaining an image. The image may be obtained using a camera of a first device. The first device may be an unauthenticated device without a user-specific security credential. The method includes transmitting a request to a server to access a voicemail box associated with a second device. The request may include a unique code based on the image. The second device may be a shared device between users. The method may include accessing the voicemail box responsive to receiving an access grant from the server.

Another aspect of this disclosure includes a system that comprises a shared device, a mobile device, and a server. The shared device may be shared between users. The mobile device may be an unauthenticated device without a user-specific security credential. The mobile device may include a camera configured to obtain an image. The image may be associated with the shared device. The mobile device may include a transmitter configured to transmit a request to access a voicemail box associated with the shared device. The request may include a unique code based on the image. The server may be configured to transmit an access grant to the mobile device to grant the mobile device access to the voicemail box associated with the shared device based on the unique code.

Another aspect of this disclosure includes a non-transitory computer-readable medium configured to store instructions that when executed by a processor, cause the processor to extract a unique code from a request from a mobile device that is an unauthenticated device without a user-specific security credential. The processor is configured to identify a shared device based on a shared device identifier (ID) indicated in the unique code. The processor is configured to verify the unique code. The processor is configured to transmit an access grant to the mobile device. The access grant may permit the mobile device access to a voicemail box associated with the shared device.

A unified communications as a service (UCaaS) platform, which includes several communications services accessible over a network, such as the Internet, may be used to deliver a complete communication experience regardless of physical location. The UCaaS platform may be implemented as a system that includes one or more shared devices among multiple users. Customers of the system may have users who need access to voicemails on the system. For example, many individual users may be registered with the system and given user-specific security credentials for accessing voicemail boxes particular to them. However, some customers may have users who are not registered users. For example, these non-registered users may be non-technical users who do not need any phone features other than voicemail. In another example, non-registered users may be temporary or seasonal, in which case providing these users with a registered account on the system is cost prohibitive. That is, training these non-registered users to access a voicemail system is time consuming and sometimes wasteful, since many of these users are temporary. Furthermore, providing these users with a user-specific security credential, such as a personal identification number (PIN), to access a voicemail box on the system may raise potential security concerns. Thus, typical systems require that users have a registered account on the system and a user-specific security credential to access voicemail, which can be cost prohibitive and time consuming to create for certain users.

Implementations of this disclosure address problems such as these by allowing for a non-registered device to access a voicemail box of a device that is shared between multiple users on a system without using a user-specific security credential or having knowledge of phone tree combinations. A non-registered device includes an unauthenticated device associated with a user who does not have a registered account on the system. The non-registered device may access a shared voicemail box on the system by scanning an image associated with a shared device or detecting a radio signal from the shared device to request access. The methods and systems hereof may reduce security risk by providing limited access to voicemail boxes on the system to unauthenticated users without the necessity of creating registered accounts for each user.

To describe some implementations in greater detail, reference is first made to examples of hardware and software structures used to implement shared device voicemail access by bypassing a user-specific security credential. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
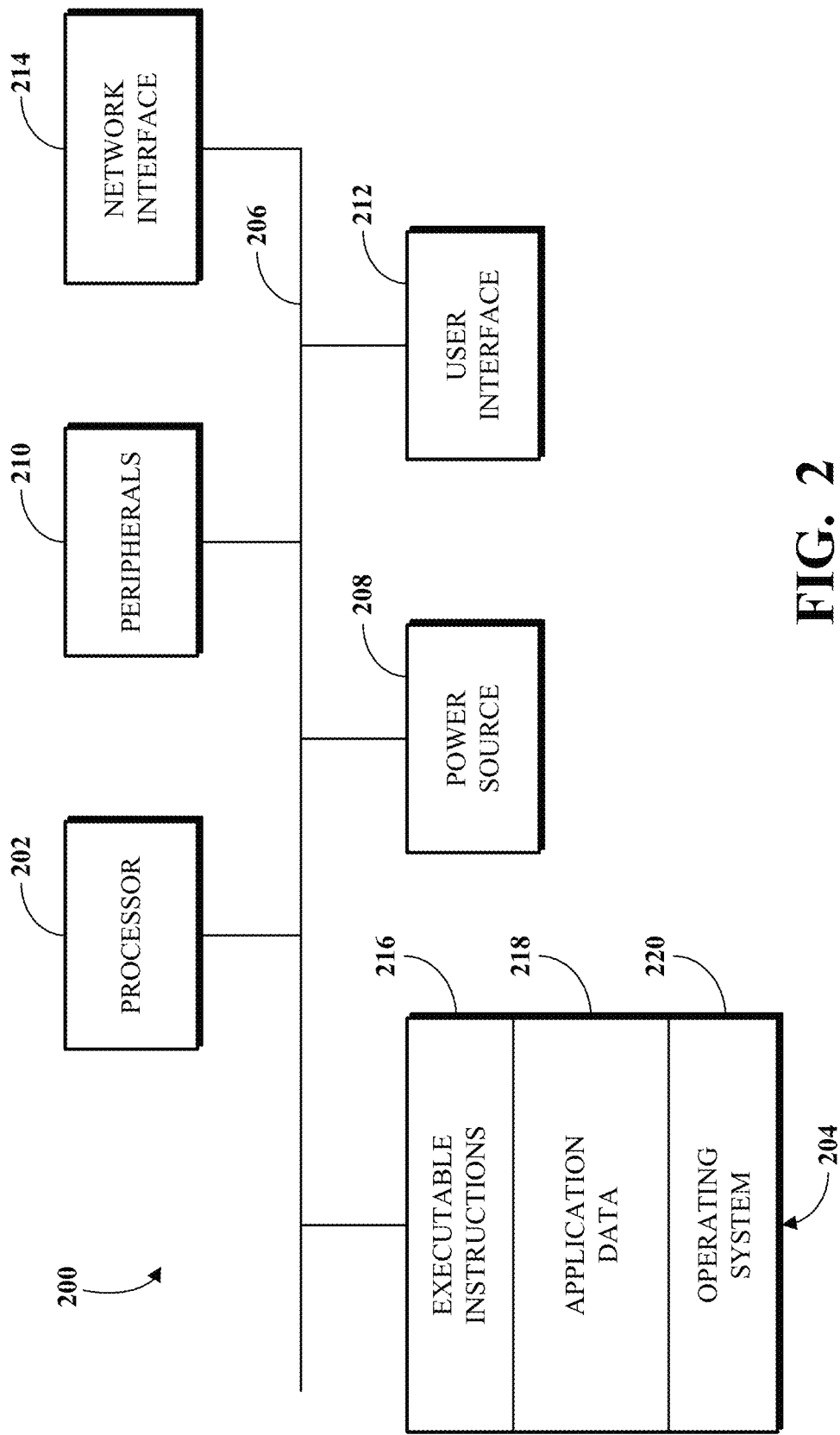
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, phase-change memory, or another form of non-volatile memory configured for persistent electronic information storage. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 may provide power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee), infrared, visible light, general packet radio service (GPRS), global system for mobile communications (GSM), code-division multiple access (CDMA), Z-Wave, another protocol, or a combination thereof.

Figure 3:
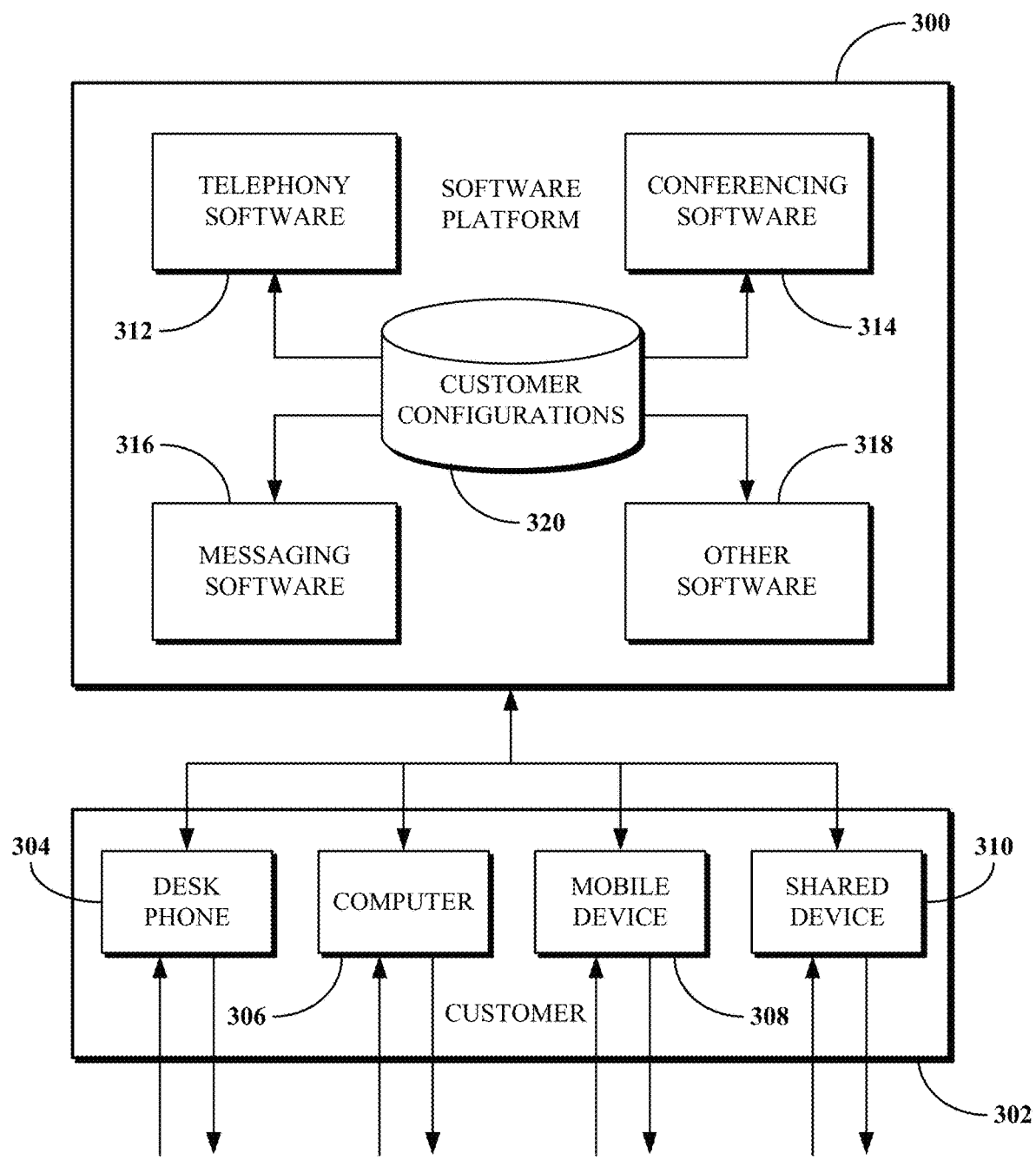
FIG. 3 is a block diagram of an example of a software platform implemented by an electronic computing and communications system.

FIG. 3 is a block diagram of an example of a software platform 300 implemented by an electronic computing and communications system, such as the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality to provide secure access to a voicemail box associated with a shared device to a non-registered user without the use of a user-specific security credential.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
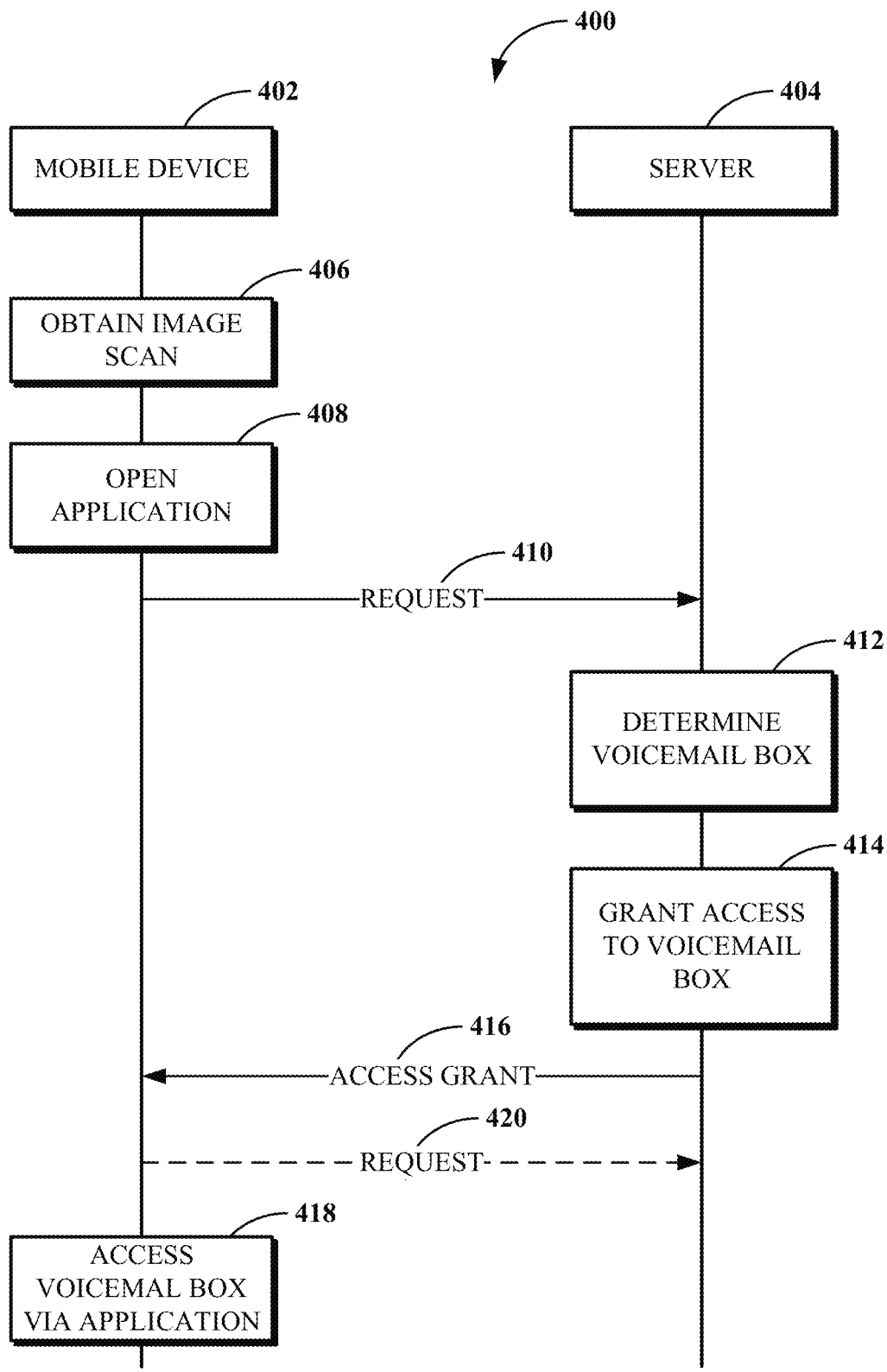
FIG. 4 is a swim lane diagram of an example of a system for providing shared device voicemail access to a non-registered user bypassing a user-specific security credential.

FIG. 4 is a swim lane diagram of an example of a system 400 for providing shared device voicemail access to a non-registered user bypassing a user-specific security credential. The system 400 includes a mobile device 402 and a server 404. In this example, the mobile device 402 is a non-registered device associated with a user who does not have a registered account on the system 400. The server 404 may be used to implement the software platform 300 shown in FIG. 3. For example, voicemail services as described herein may be implemented using the telephony software 312.

The mobile device 402 is configured to scan 406 an image using a camera of the mobile device 402. The image may be associated with a shared device on the system 400. The image may be fixed on or near the shared device, or it may be displayed on a display of the shared device. The shared device may be a desk phone, a wall phone, a computing device, or any device that can be shared by multiple users on a network. The shared device may be associated with a particular extension on the system 400 and a voicemail box. The image may be a scannable code, such as, for example, a quick response (QR) code, bar code, optical label, or any image that can be embedded with a code. The image may include a unique code associated with a uniform resource locator (URL), shared device identifier (ID), shared device location, shared device extension, voicemail box address, voicemail box PIN, or any combination thereof.

Scanning the image may trigger the mobile device 402 to open 408 an application. The application may include an interface that allows user interaction with the voicemail box associated with the shared device. The application may be a web application that is configured to run on a browser of the mobile device 402. In some examples, the application may be a client application of a client, such as one or more of the clients 304 through 310 shown in FIG. 3. The client application may be an instance of software running on the mobile device 402 that is used to obtain voicemail access of the shared device without the use of a user-specific security credential. In some examples, the web application may include a button on the interface that may be used to cross-launch the client application. In some examples, scanning the image may cause the mobile device 402 to display a prompt on the interface to confirm that the user would like to access the voicemail box associated with the shared device.

The mobile device 402 is configured to transmit a request 410 to the server 404. The request 410 may be transmitted based on an input received via the interface of the application. The request 410 may be a request for access to the voicemail box associated with the shared device and may include a unique code based on the image. The unique code may include data associated with a shared device ID, shared device location, shared device extension, voicemail box address, voicemail box PIN, mobile device ID, or any combination thereof. The unique code may be generated by the application. In some examples, the unique code may be a one-time code associated with the mobile device 402 for added security. The one-time code may be used by the server 404 such that if reuse of that code is attempted, access will be denied. The application may set an expiration for the one-time code, for example, based on a number of access requests or a duration of time. The mobile device 402 may perform a hashing function based on a mobile device ID of the mobile device 402 to generate the one-time code. The hashing function may be used to prevent two mobile devices from generating the same code. In some implementations, the unique code may be associated with a global positioning system (GPS) location of the mobile device 402. The GPS location of the mobile device 402 may be used to confirm that the mobile device 402 is at the location of the shared device, and access to the voicemail box may be granted based on that confirmation. In some implementations, for example where there is no GPS signal, Wi-Fi triangulation may be used to confirm that the mobile device 402 is at the location of the shared device, and access to the voicemail box may be granted based on that confirmation.

In response to receiving the request 410 from the mobile device 402, the server 404 may determine 412 the voicemail box based on the voicemail box indicated in the unique code of the request 410. If the unique code of the request does not indicate a voicemail box address, the server may determine the voicemail box based on the shared device ID, shared device location, or shared device extension indicated in the unique code of the request 410.

The server 404 is configured to grant access 414 to the voicemail box by generating an access grant 416. The access grant 416 is a permission that the mobile device 402 may use to access the voicemail box. The server 404 may grant access 414 to the voicemail box using a voicemail box PIN indicated in the unique code of the request 410. In an example where the unique code of the request 410 does not indicate a voicemail box PIN, the server 404 may grant access 414 to the voicemail box based on the shared device ID, shared device location, or shared device extension. For example, the server 404 may automatically grant access 414 to the voicemail box based on the association of image to the shared device ID, shared device location, or shared device extension. The access granted may be a limited access. For example, the limited access may be a read-only access such that the user cannot delete any voicemails in the voicemail box. The level of access granted may be based on an administrator setting. The server 404 may be configured to set an expiration for the access grant 416.

The server 404 is configured to transmit the access grant 416 to the mobile device 402. In response to receiving the access grant 416 from the server 404, the mobile device 402 may access 418 the voicemail box using the application. In some examples, the mobile device 402 may transmit a request 420 based on the access grant 416 to the server 404 to access the voicemail box associated with the shared device.

Figure 5:
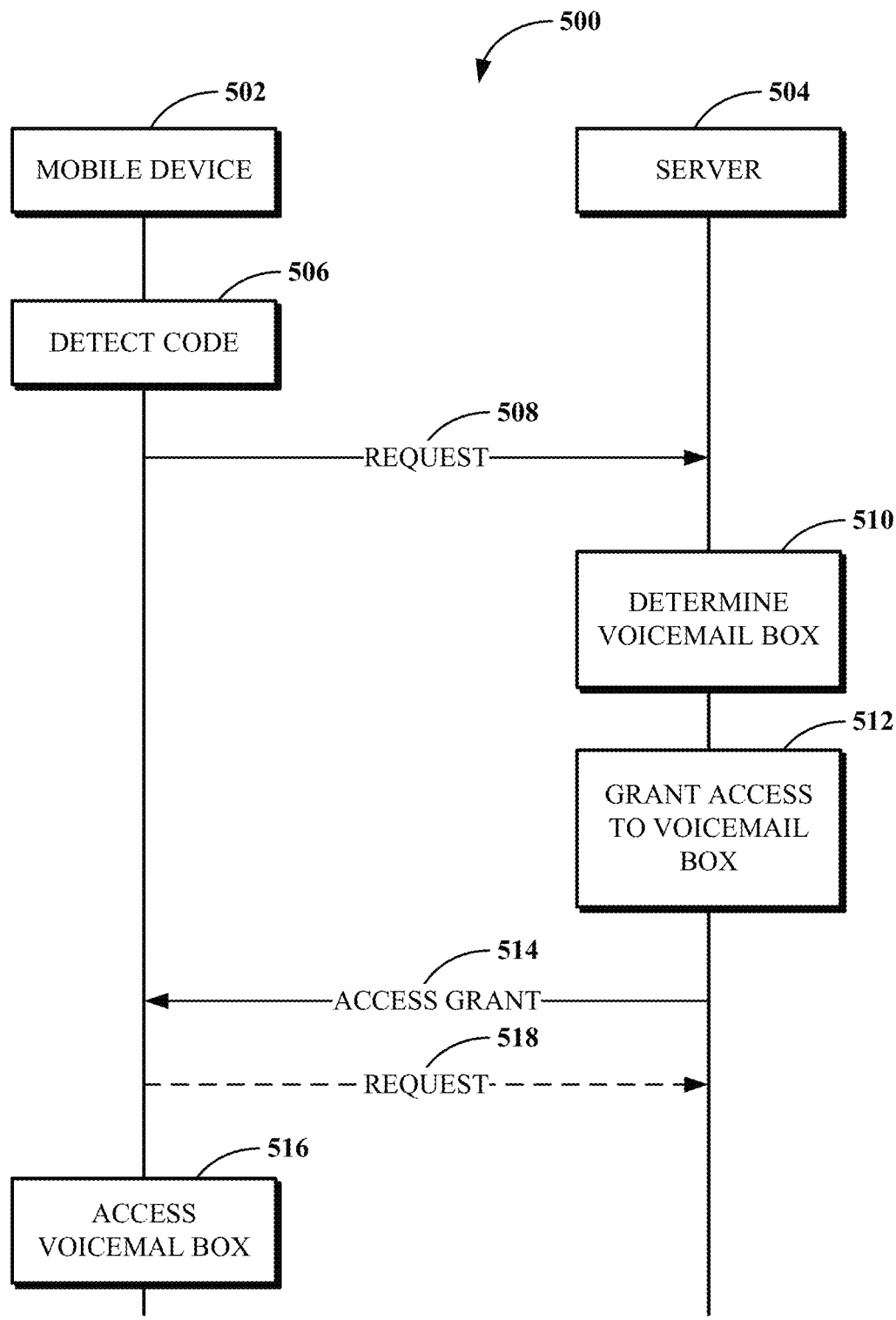
FIG. 5 is a swim lane diagram of another example of a system for providing shared device voicemail access to a non-registered user bypassing a user-specific security credential.

FIG. 5 is a swim lane diagram of another example of a system 500 for providing shared device voicemail access to a non-registered user bypassing a user-specific security credential. The system 500 includes a mobile device 502 and a server 504. The mobile device 502 may be the same as the mobile device 402 shown in FIG. 4, and the server 504 may be the same as the server 404 shown in FIG. 4. In this example, the mobile device 502 is a non-registered device associated with a user who does not have a registered account on the system 500. The server 504 may be used to implement the software platform 300 shown in FIG. 3. In this example, a code may be associated with a proximity to a shared device. For example, the code may be transmitted from the shared device using a short range radio signal, such as near-field communication (NFC), Bluetooth low energy (BLE), ultrasonic frequency, Wi-Fi, or the like.

The mobile device 502 is configured to detect 506 a short range radio signal transmitted from a shared device using one or more sensors of the mobile device 502 when the mobile device 502 is within a proximity of the shared device. The shared device may be a desk phone, a wall phone, a computing device, or any device that can be shared by multiple users on a network. The shared device may be associated with a particular extension on the system 500 and a voicemail box. The short range radio signal contains a code. The code may include a unique code associated with a URL, shared device ID, shared device location, shared device extension, voicemail box address, voicemail box PIN, or any combination thereof. The unique code may be generated by the application. In some examples, the unique code may be a one-time code associated with the mobile device 502 for added security. The one-time code may be used by the server 504 such that if reuse of that code is attempted, access will be denied. The application may set an expiration for the one-time code, for example, based on a number of access requests or a duration of time. The mobile device 502 may perform a hashing function based on a mobile device ID of the mobile device 502 to generate the one-time code. The hashing function may be used to prevent two mobile devices from generating the same code. In some implementations, the unique code may be associated with a GPS location of the mobile device 402. The GPS location of the mobile device 502 may be used to confirm that the mobile device 402 is at the location of the shared device, and access to the voicemail box may be granted based on that confirmation. In some implementations, for example where there is no GPS signal, Wi-Fi triangulation may be used to confirm that the mobile device 502 is at the location of the shared device, and access to the voicemail box may be granted based on that confirmation.

In some examples, detection of the short range radio signal may trigger the mobile device 502 to open an application. The application may include an interface that allows user interaction with the voicemail box associated with the shared device. The application may be a web application that is configured to run on a browser of the mobile device 502. In some examples, the application may be a client application of a client, such as one or more of the clients 304 through 310 shown in FIG. 3. The client application may be an instance of software running on the mobile device 502 that is used to obtain voicemail access of the shared device without the use of a user-specific security credential. In some examples, the web application may include a button on the interface that may be used to cross-launch the client application. In some examples, detection of the short range radio signal may cause the mobile device 502 to display a prompt on the interface to confirm that the user would like to access the voicemail box associated with the shared device. In some examples, detection of the code may be initiated by opening the client application.

The mobile device 502 is configured to transmit a request 508 to the server 504. The request 508 may be transmitted based on an input received via the interface of the application. The request 508 may be a request for access to the voicemail box associated with the shared device and may include a unique code based on the detected code. The unique code may include data associated with a shared device ID, shared device location, shared device extension, voicemail box address, voicemail box PIN, mobile device ID, or any combination thereof.

In response to receiving the request 508 from the mobile device 502, the server 504 may determine 510 the voicemail box based on the voicemail box indicated in the unique code of the request 508. If the unique code of the request does not indicate a voicemail box address, the server may determine the voicemail box based on the shared device ID, shared device location, or shared device extension indicated in the unique code of the request 508.

The server 504 is configured to grant access 512 to the voicemail box by generating an access grant 514. The server 504 may grant access 512 to the voicemail box using a voicemail box PIN indicated in the unique code of the request 508. In an example where the unique code of the request 508 does not indicate a voicemail box PIN, the server 504 may grant access 512 to the voicemail box based on the shared device ID, shared device location, or shared device extension. For example, the server 504 may automatically grant access 512 to the voicemail box based on the association of image to the shared device ID, shared device location, or shared device extension. In some examples, the access may be granted based on the mobile device 502 being connected via Wi-Fi to the same network as the shared device. The access granted may be a limited access. For example, the limited access may be a read-only access such that the user cannot delete any voicemails in the voicemail box. The level of access granted may be based on an administrator setting. The server 504 may be configured to set an expiration for the access grant 514.

The server 504 is configured to transmit the access grant 514 to the mobile device 502. In response to receiving the access grant 514 from the server 504, the mobile device 502 may access 516 the voicemail box using the application. In some examples, the mobile device 502 may transmit a request 518 based on the access grant 514 to the server 504 to access the voicemail box associated with the shared device.

Figure 6:
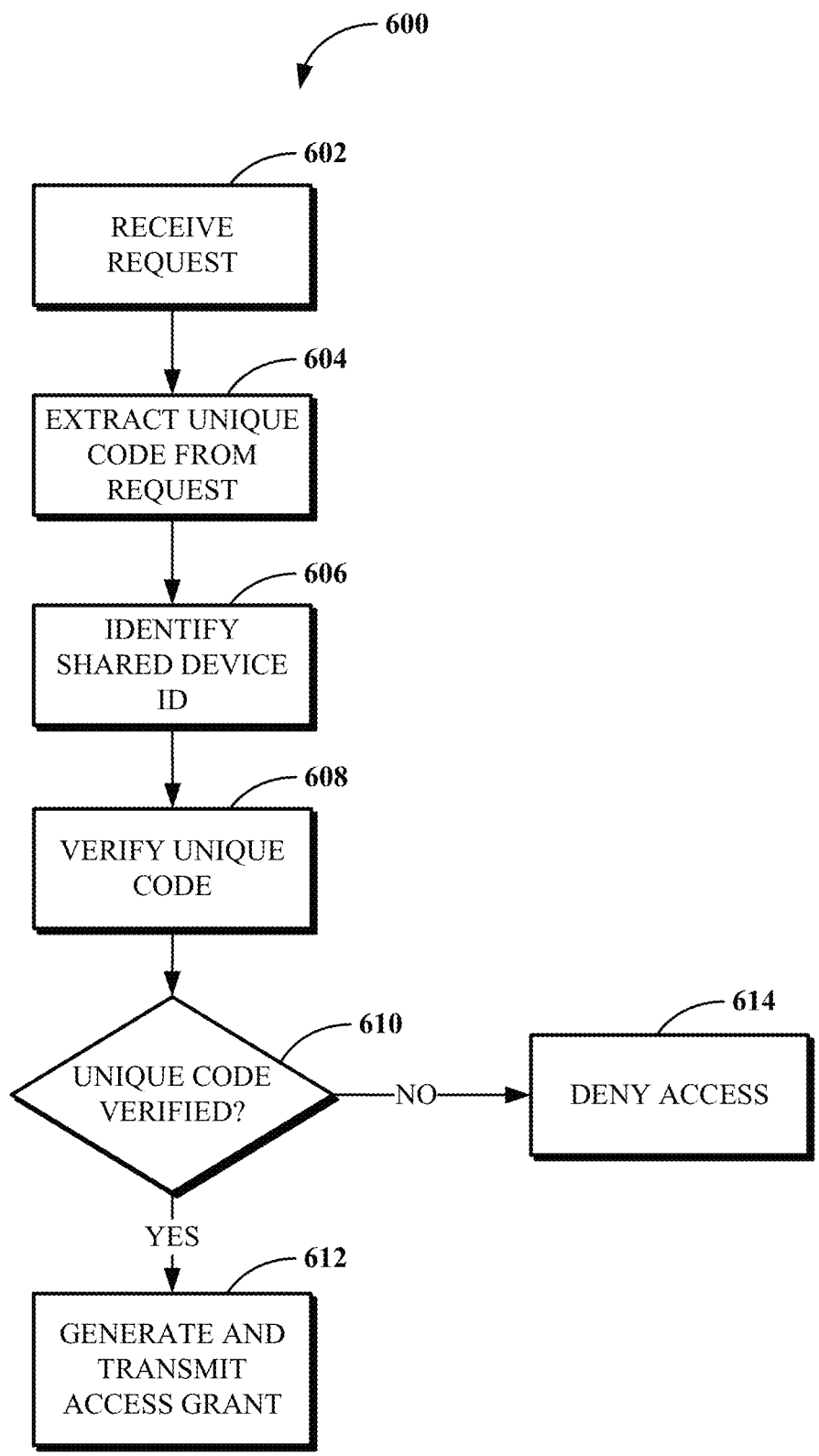
FIG. 6 is a flowchart of an example of a method for providing shared device voicemail access to a non-registered user bypassing a user-specific security credential.
Figure 7:
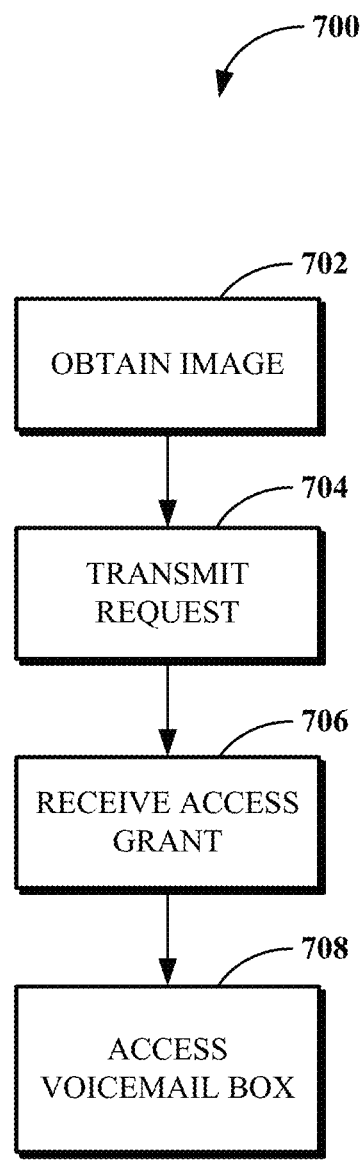
FIG. 7 is a flowchart of an example of a method for accessing a shared device voicemail box bypassing a user-specific security credential.
Figure 8:
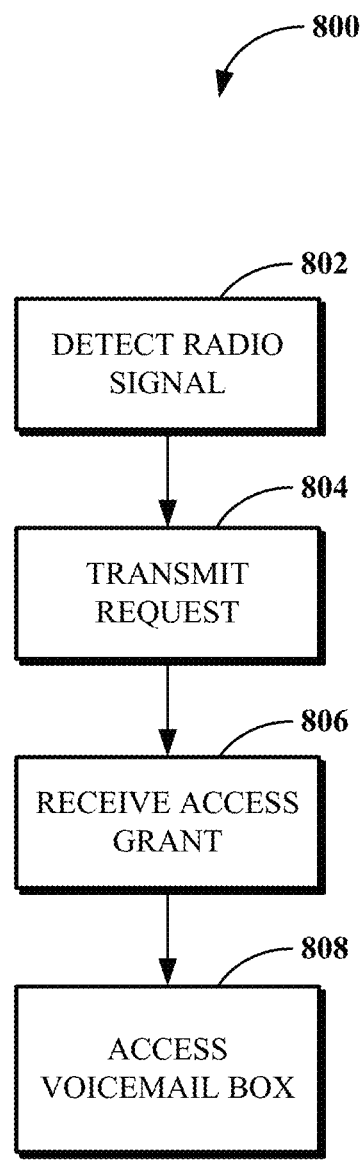
FIG. 8 is a flowchart of another example of a method for accessing a shared device voicemail box bypassing a user-specific security credential.

To further describe some implementations in greater detail, reference is next made to examples of methods that may be performed by or using a system configured to provide secure access to a voicemail box associated with a shared device to a non-registered user without the use of a user-specific security credential. FIGS. 6-8 are flowcharts of examples of methods for accessing a shared device voicemail box bypassing a user-specific security credential. The methods can be executed using computing devices, such as the systems, hardware, and software described with respect to FIGS. 1-5. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 6 is a flowchart of an example of a method 600 for providing shared device voicemail access to a non-registered user bypassing a user-specific security credential. At 602, a server, such as the server 404 shown in FIG. 4 or the server 504 shown in FIG. 5, receives a request from a mobile device, such as the mobile device 402 shown in FIG. 4 or the mobile device 502 shown in FIG. 5. The request may be received based on an input received via the interface of an application on the mobile device. The request may be a request for access to a voicemail box associated with the shared device and may include a unique code. The unique code may be based on an image or a detected code. The unique code may include data associated with a shared device ID, shared device location, shared device extension, voicemail box address, voicemail box PIN, mobile device ID, or any combination thereof.

At 604, the server extracts the unique code from the request. At 606, the server may identify the shared device ID indicated in the unique code of the request. The server may use the shared device ID to determine the voicemail box associated with the shared device, for example, using a lookup table. In some examples, the voicemail box associated with the shared device may be determined based on an indication of a voicemail box address in the request from the mobile device. If the unique code of the request does not indicate a shared device ID or voicemail box address, the server may determine the voicemail box based on a shared device location or shared device extension indicated in the unique code of the request.

At 608, the server verifies the unique code. The server may verify the unique code based on a determination of whether the unique code includes a security credential that matches a security credential of the voicemail box associated with the shared device. At 610, if the unique code includes a security credential that matches a security credential of the voicemail box associated with the shared device, the server determines that the unique code is verified. The security credential may be a voicemail box PIN. At 612, in response to the verification of the unique code, the server may grant access to the voicemail box using the voicemail box PIN indicated in the unique code of the request by generating and transmitting an access grant. In an example where the unique code of the request does not indicate a voicemail box PIN, the server may determine that the unique code is verified based on the shared device ID, shared device location, or shared device extension. For example, the server may automatically grant access to the voicemail box based on the association of the image or detected code to the shared device ID, shared device location, or shared device extension. In some examples, the access may be granted based on the mobile device being connected via Wi-Fi to the same network as the shared device. The access granted may be a limited access. For example, the limited access may be a read-only access such that the user cannot delete any voicemails in the voicemail box. The level of access granted may be based on an administrator setting. The server may be configured to set an expiration for the access grant.

If the server determines that the unique code is not verified at 610, the server denies access to the voicemailbox associated with the shared device at 614. The server may determine that the unique code is not verified based on an expiration of a timer or similar time-based policy for a life of the unique code, a number of times the unique code was used to request access being above a threshold, a mismatch between the security credential of the unique code and a security credential of the voicemail box.

FIG. 7 is a flowchart of an example of a method 700 for accessing a shared device voicemail box bypassing a user-specific security credential. At 702, a mobile device, such as the mobile device 402 shown in FIG. 4, obtains an image, for example, by scanning the image using a camera of the mobile device. The image may be associated with a shared device on the system. The image may be fixed on or near the shared device, or it may be displayed on a display of the shared device. The shared device may be a desk phone, a wall phone, a computing device, or any device that can be shared by multiple users on a network. The shared device may be associated with a particular extension on the system and a voicemail box. The image may be a scannable code, such as, for example, a QR code, bar code, optical label, or any image that can be embedded with a code. The image may include a unique code associated with a URL, shared device identifier ID, shared device location, shared device extension, voicemail box address, voicemail box PIN, or any combination thereof.

At 704, the mobile device transmits a request to a server, such as the server 404 shown in FIG. 4. The request may be a request for access to the voicemail box associated with the shared device and may include a unique code based on the image. The unique code may include data associated with a shared device ID, shared device location, shared device extension, voicemail box address, voicemail box PIN, mobile device ID, or any combination thereof. In some examples, the unique code may be a one-time code associated with the mobile device 402 for added security. The one-time code may be used by the server such that if reuse of that code is attempted, access will be denied. An expiration may be set for the one-time code, for example, based on a number of access requests or a duration of time.

At 706, the mobile device receives an access grant from the server. The access grant may allow the mobile device limited access to the voicemail box of the shared device. For example, the limited access may be a read-only access such that the user cannot delete any voicemails in the voicemail box. The level of access granted may be based on an administrator setting. In some examples, the access grant may have an expiration. In response to receiving the access grant from the server, the mobile device may access the voicemail box at 708. In some examples, the mobile device may transmit a request based on the access grant to the server to access the voicemail box associated with the shared device.

FIG. 8 is a flowchart of another example of a method 800 for accessing a shared device voicemail box bypassing a user-specific security credential. At 802, a mobile device, such as the mobile device 502 shown in FIG. 5, detects a radio signal. The radio signal may be a short range radio signal transmitted from a shared device. The mobile device may detect the radio signal using one or more sensors of the mobile device when the mobile device is within a proximity of the shared device. The radio signal may be a short range radio signal, such as a signal using NFC, BLE, Wi-Fi, ultrasonic frequency, or the like. The shared device may be a desk phone, a wall phone, a computing device, or any device that can be shared by multiple users on a network. The shared device may be associated with a particular extension on the system 500 and a voicemail box. The radio signal may include a unique code associated with a URL, shared device ID, shared device location, shared device extension, voicemail box address, voicemail box PIN, or any combination thereof. In some examples, the unique code may be a one-time code associated with the mobile device for added security. The one-time code may be used by the server such that if reuse of that code is attempted, access will be denied. An expiration may be set for the one-time code, for example, based on a number of access requests or a duration of time.

At 804, the mobile device transmits a request to a server, such as the server 504 shown in FIG. 5. The request may be a request for access to the voicemail box associated with the shared device and may include a unique code based on the detected radio signal. The unique code may include data associated with a shared device ID, shared device location, shared device extension, voicemail box address, voicemail box PIN, mobile device ID, or any combination thereof.

At 806, the mobile device receives an access grant from the server. The access grant may allow the mobile device limited access to the voicemail box of the shared device. For example, the limited access may be a read-only access such that the user cannot delete any voicemails in the voicemail box. The level of access granted may be based on an administrator setting. In some examples, the access grant may have an expiration. In response to receiving the access grant from the server, the mobile device may access the voicemail box at 808. In some examples, the mobile device may transmit a request based on the access grant to the server to access the voicemail box associated with the shared device.

An aspect may include a method that includes transmitting, from an unauthenticated device, a request to a server to access a voicemail box associated with a shared device, the request including a unique code based on an image obtained at the unauthenticated device. The method may include receiving an access grant from the server based on the request. The method may include accessing the voicemail box from an application of the unauthenticated device.

An aspect may include a system that comprises a shared device, an unauthenticated device, and a server. The shared device may be shared between two or more users. The unauthenticated device may include a transmitter configured to transmit a request to access a voicemail box associated with the shared device, the request includes a unique code based on an image obtained at the unauthenticated device. The server may be configured to transmit an access grant based on the request to the unauthenticated device to grant the unauthenticated device access to the voicemail box associated with the shared device.

An aspect may include a non-transitory computer-readable medium comprising a memory configured to store instructions that when executed by a processor, cause the processor to perform operations. The operations may include transmitting, from an unauthenticated device, a request to a server to access a voicemail box associated with a shared device, the request including a unique code based on an image obtained at the unauthenticated device. The operations may include receiving an access grant from the server based on the request. The operations may include accessing the voicemail box from an application of the unauthenticated device.

In one or more aspects, the application may be a client application. In one or more aspects, the application may be a web application. In one or more aspects, the unauthenticated device may be a mobile device. In one or more aspects, the shared device may be a desk phone or a computer. In one or more aspects, the unique code may be associated with at least one of a URL, a device ID of the shared device, a location of the shared device, an extension of the shared device, a voicemail box address, or a voicemail box PIN. In one or more aspects, the access grant may provide a limited access to the voicemail box. In one or more aspects, the limited access may be a read-only access. In one or more aspects, the limited access may be based on an expiration timer. In one or more aspects, the unique code may be verified based on a determination that the unique code includes a first security credential that matches a second security credential, the second security credential associated with the voicemail box. In one or more aspects, the first security credential may be a voicemail box PIN. In one or more aspects, the unique code may be verified based on a shared device ID, a location of the shared device, or an extension of the shared device. In one or more aspects, the unique code may be associated with a scanned image or a detected code.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    transmitting, via an application using a camera of an unauthenticated device,
    a request to a server to access a voicemail box associated with a shared device,
    the request including a unique code based on an image obtained at the unauthenticated device;
    receiving an access grant from the server based on the request; and
    accessing the voicemail box from the application of the unauthenticated device.

2. The method of claim 1, wherein the application is a client application.

3. The method of claim 1, wherein the application is a web application.

4. The method of claim 1, wherein the unauthenticated device is a mobile device and the shared device is a desk phone or a computer.

5. The method of claim 1, wherein the unique code is associated with at least one of a uniform resource locator (URL), a device identifier (ID) of the shared device, a location of the shared device, an extension of the shared device, a voicemail box address, or a voicemail box personal identification number (PIN).

6. The method of claim 1, wherein the access grant provides limited access to the voicemail box.

7. The method of claim 6, wherein the limited access is read-only access.

8. The method of claim 6, wherein the limited access is based on an expiration timer.

9. A system, comprising:
 a shared device that is shared between users;
 an unauthenticated device comprising:
  a transmitter configured to transmit, via an application using a camera,
  a request to access a voicemail box associated with the shared device,
  the request includes a unique code based on an image obtained at the unauthenticated device; and
 a server configured to transmit an access grant based on the request to the unauthenticated device to grant the unauthenticated device access to the voicemail box associated with the shared device.

10. The system of claim 9, wherein the unauthenticated device is configured to access the voicemail box via the application on the unauthenticated device.

11. The system of claim 10, wherein the application is a web application of a client application.

12. The system of claim 9, wherein the unique code is associated with at least one of a uniform resource locator (URL), a shared device identifier (ID), a shared device location, a shared device extension, a voicemail box address, or a voicemail box personal identification number (PIN).

13. The system of claim 9, wherein the access grant provides limited access to the voicemail box.

14. The system of claim 13, wherein the limited access is read-only access.

15. The system of claim 13, wherein the limited access is based on an expiration timer.

16. A non-transitory computer-readable medium comprising a memory configured to store instructions that when executed by a processor, cause the processor to perform operations comprising:
 transmitting, via an application using a camera of an unauthenticated device,
 a request to a server to access a voicemail box associated with a shared device,
 the request including a unique code based on an image obtained at the unauthenticated device;
 receiving an access grant from the server based on the request; and
 accessing the voicemail box from the application of the unauthenticated device.

17. The non-transitory computer-readable medium of claim 16, wherein the operations further comprise:
 verifying the unique code based on a determination that the unique code includes a first security credential that matches a second security credential, the second security credential associated with the voicemail box.

18. The non-transitory computer-readable medium of claim 17, wherein the first security credential is a voicemail box personal identification number (PIN).

19. The non-transitory computer-readable medium of claim 16, wherein the operations further comprise:
 verifying the unique code based on a shared device identifier (ID), a location of the shared device, or an extension of the shared device.

20. The non-transitory computer-readable medium of claim 16, wherein the unique code is associated with a scanned image or a detected code.

\* \* \* \* \*